Nov. 27, 1928.
L. W. NAYLOR
1,693,207
APPARATUS FOR REVIVIFICATION OF FILTERING MATERIALS
Original Filed Aug. 31, 1922
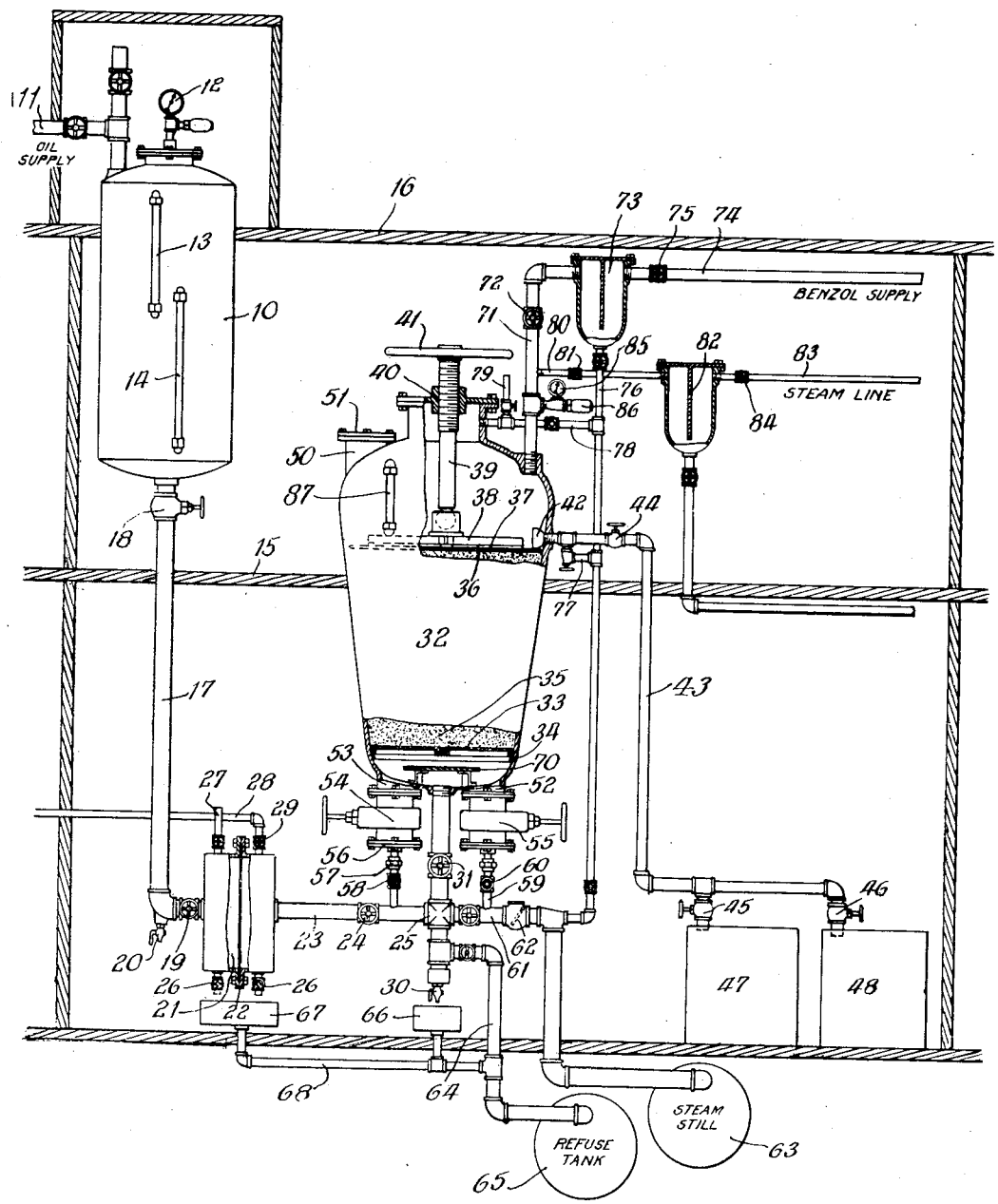
Inventor:
Leslie W. Naylor
By: Wm O. Bell
Atty.

Patented Nov. 27, 1928.

1,693,207

UNITED STATES PATENT OFFICE.

LESLIE W. NAYLOR, OF FLORENCE, COLORADO, ASSIGNOR TO CONTINENTAL OIL COMPANY, OF DENVER, COLORADO, A CORPORATION OF MAINE.

APPARATUS FOR REVIVIFICATION OF FILTERING MATERIALS.

Original application filed August 31, 1922, Serial No. 585,422. Divided and this application filed March 3, 1923. Serial No. 622,492.

This invention relates to apparatuses for the revivification of filtering materials, and more particularly to apparatuses which may be employed in connection with the process disclosed in my co-pending application, Serial No. 585,422, filed August 31, 1922, of which this application is a division the process therein disclosed being one for effecting the revivification or restoration of filtering materials to their original efficiency after they have become spent or choked by the accummulation of matter left behind by oil or the like passing through the filter.

The principal object of my invention is to provide an apparatus to accomplish the restoration more completely than has been heretofore possible and with a minimum cost and labor.

Other objects of my invention are to provide an apparatus to accomplish the restoration with a minimum of handling and loss of material, and to provide a filter with an apparatus by which filtering materials such as fuller's earth can be treated partly or entirely within the filter chamber.

Further objects of my invention will become apparent as the disclosure proceeds and the description is read in connection with the accompanying drawing, which illustrates a selected embodiment of the invention. The apparatus which has been illustrated is designed to supply benzol or coal-gas oil, as it is sometimes called, or any other suitable fluid to a filter so that the accumulated foreign material extracted from petroleum and similar oils may be extracted from the filtering material.

As my aforesaid co-pending application discloses a process wherein benzol is employed, I will hereinafter refer to it as the chemical agent I use to accomplish the restoration of the filtering material. However, it will be readily understood that any other suitable fluid could be employed in connection with my improved apparatus.

Most of the carbon and other foreign matter extracted from petroleum and like oils by filtering materials collects on the side where the oil enters. For example; in an 8 ft. filter that has been used for the usual period without cleaning, about 3 feet adjacent to the oil inlet will be very black and otherwise extremely marked with the accumulated foreign matter, whereas the remaining 5 feet will have an increasingly less amount of foreign matter. On this account I have found it very advantageous to pass the benzol through the filtering material in a direction opposite to that in which the oil moves during the filtering process.

I have found it practical to equip a filter with suitable inlets and piping leading to sources of supply and storage for benzol and steam so that the filtering material can be treated partly or entirely without removing it from the filter chamber. The accompanying drawing illustrates such an apparatus.

Referring to the drawing, 10 indicates a suitable storage tank for oil which is connected with a supply pipe 11 leading to any suitable source. This tank is also equipped with the necessary gauges etc. 12, 13 and 14, found convenient or necessary in practice. Usually this tank will be supported in an elevation so as to feed the oil by gravity to and through the filter. As shown it is supported somewhat above the second floor 15 and projects through the third floor 16 of a suitable building. A pipe 17 equipped with suitable valves 18 and 19 and a drain cock 20 leads from the bottom of the tank 10 to a trap 21 equipped with a screen 22 usually of 100 mesh wire, which in turn is connected by a pipe 23 equipped with a valve 24 to an upright header 25. The trap 21 has suitable drain cocks 26, a vent 27, and a connection 28 with a source of compressed air which is controlled by a valve 29 and used to blow out the screen 22. The header 25 has a drain cock 30 at the bottom, and a valve 31 adjacent its upper end where it communicates with the bottom of a filter chamber 32. Spaced from the bottom of the filter is a suitable screen 33, preferably 100 mesh wire, turned into an angle iron 34 and calked with lead. Upon this screen is a suitable quantity of filtering material, such as fuller's earth 35. On top of the fuller's earth is another fine screen 36, on top of which is a coarse screen 37 held down by a suitable head 38 connected with the stem 39 threaded into a cover 40 and equipped with a hand wheel 41.

An outlet 42 communicates with the filter chamber just above the screen 37 and connects with a pipe 43 controlled by valves 44, 45 and 46 leading to the pans 47 and 48.

The upper end of the chamber is equipped with a filling opening 50 closed by a cover 51. The bottom of the chamber is equipped with two large tubular passages 52 and 53 which are controlled by gate valves 54 and 55. The valve 54 is connected by a suitable flange joint 56 with a small pipe 57 leading to the pipe 23 and controlled by a valve 58. The valve 55 is similarly connected with a pipe 59 controlled by a valve 60 and leading to a pipe 61 equipped with a check valve 62 and communicating with a steam still 63. The header 25 is connected by a pipe 64 with a refuse tank 65. Drip pans 66 and 67 are connected by suitable piping 68 with the pipe 64.

Just above the discharge end of the header 25 is placed a baffle plate 70 to prevent the oil from perforating or otherwise making openings in the filtering material.

The upper end of the chamber is equipped with a pipe 71 controlled by a valve 72 and communicating through a trap 73 with a source of benzol supply 74. If desired a valve 75 may be located beyond the trap 73. Preferably the bottom of the trap is connected by a pipe 76 with the pipe 61 leading to the steam still and pipes 77 and 78 connect the upper end of the filter chamber and the oil discharge with the steam still. The pipe 78 is conveniently equipped with an air vent 79. The pipe 80 controlled by valve 81 connects the pipe 71 below the valve 72 through a trap 82 with a steam line 83 which is controlled by a valve 84. The pipe 71 is equipped with a suitable gauge 85 and pop valve 86 below the junction with the pipe 80 and the upper portion of the filter chamber is fitted with a suitable gauge glass 87.

A storage tank 10 and a filter chamber together with most of the communicating piping should be enclosed within a heating room, or provided with suitable heating jackets and insulating covers. The oil to be filtered is heated in the tank 10 and led through the trap 21 and strainer 22 to the bottom of the filter chamber and allowed to work its way through the filter material to the outlet 42 when it runs down to the pans 47 and 48.

After a period of use the filtering material becomes inefficient and must either be renewed or revived. With an apparatus such as I have described this may be done without removing the material from the container if desired, or it may be treated with benzol and steam while in the container and removed for drying.

The filter chamber is made tight, the outlet and the inlet of oil cut off, the valves 54, 55, 58 and 60 are opened, and the supply of benzol turned on. The benzol should be clear and clean, free from moisture and the like and should be admitted slowly.

When the benzol passing out the bottom of the chamber is fairly clear, the valves 54 and 55 should be closed and the chamber filled to about a foot above the top of the filtering material and allowed to stand over night. After this the benzol is drained off and the chamber is heated to approximately 300° F. to have the filtering material and everything else contacting with steam at a temperature above that that would tend to condensation. Steam, preferably superheated, is then admitted and the valves 54 and 55, 58 and 60 opened to permit communication with the steam still 63. Steam should be continued until the odor of benzol is all driven out when the filtering material will be found fully revived to its normal efficiency, if not actually increased in efficiency.

By heating the filtering material in the container to approximately the temperature of dry steam and afterwards treating the material with super-heated steam, the fuller's earth or other material is left practically dry at the end of the process.

If super-heated steam is not available, or proper means for heating the chamber are absent, or for any other reason the temperature of the chamber or the steam permits the filtering material to become moist, it can be removed and treated with a suitable dryer.

From the foregoing it will be clear that I have provided an apparatus by which filtering materials can be thoroughly revived and restored to their normal condition and that this can be accomplished with a minimum of handling, and a minimum of loss thereof.

I am aware that changes in the form, construction and arrangement of parts may be made without departing from the spirit and without sacrificing the advantages of the invention and I reserve the right to make all such changes as fairly fall within the scope of the following claims.

I claim:

1. In a device of the class described, for treating hydro-carbons, a filtering chamber, filtering material therein, means for admitting a liquid to be filtered into one end of the chamber, means for withdrawing filtered liquid from the opposite end of the chamber, separate means for selectively admitting a cleansing liquid and steam into said opposite end of the chamber, separate means for selectively withdrawing the cleansing liquid and the steam from the first-mentioned end of the filter chamber, and means for introducing an agent for recovering the cleansing fluid remaining in the filtering material.

2. In a device of the class described, for treating liquid hydrocarbon, a filter chamber, filtering material therein, means for admitting a liquid to be filtered into the bottom of the chamber, means for withdrawing filtered liquid from the top of the chamber, separate means for selectively admitting a cleansing liquid and steam into the upper end of the chamber, separate means for selectively drawing off the cleansing liquid and the steam from the bottom portion of the chamber, and means for introducing an agent for recovering the cleansing fluid remaining in the filtering material.

3. In a device of the class described, for treating liquid hydro-carbon, a filter chamber, filtering material therein, means for admitting liquid to be filtered into one end of the chamber, means for withdrawing filtered liquid from the opposite end of the chamber, means including separate conduits for selectively admitting a cleansing liquid and steam into said opposite end of the chamber, separate means for selectively drawing off the cleansing liquid and steam from said first-mentioned end of the chamber, means for heating the filter chamber and the conduits to prevent condensation of steam therein, and means for introducing an agent for recovering the cleansing fluid remaining in the filtering material.

4. In a device of the class described, for treating liquid hydro-carbon, a heating compartment, a filter chamber therein, filtering material within the filter chamber, means for admitting a liquid to be filtered into one end of the chamber, means for withdrawing the filtered liquid from the opposite end of the chamber, separate means for selectively admitting a cleansing liquid and steam into said opposite end of the chamber, and separate means for selectively withdrawing from the first-mentioned end of the chamber from the cleansing liquid and steam, and means for introducing an agent for recovering the cleansing liquid remaining in the filtering material.

5. Apparatus for filtering liquid hydro-carbons and for revivifying the filtering material comprising in combination a filter chamber, a filter bed in the chamber, means for providing a flow of the liquid hydrocarbon through the bed, means for supplying a flow of non-aqueous cleansing agent through the filter bed in a direction reverse to the flow of the hydrocarbon, and means to supply a stream of dry water vapor through the bed in the same direction as the cleansing agent, each of said means being valve controlled to permit successive flows by gravity from the bottom of the chamber through separate outlets so that the cleansing agent may be recovered.

6. An apparatus for filtering hydrocarbons and for revivifying the filtering material comprising in combination a filter chamber, a filtering bed arranged in said chamber and spaced from the top and bottom of said chamber, an inlet line arranged in the bottom of said chamber and below said bed, a baffle plate between said inlet and the bottom of said bed, an outlet line at the side of said chamber above the bed, a cleansing fluid line connected to the top of said chamber above said bed, means for withdrawing the fluid from the bottom of said chamber below said bed, means for recovering said fluid, a steam line operated independently of said liquid line and entering the top of said chamber above said bed, means for withdrawing the steam from the bottom of said chamber below said bed, a steam still operatively connected to said last withdrawing means and independent of said recovering means, and valve means for selectively controlling any of said lines.

7. An apparatus for filtering a liquid hydro-carbon and for revivification of the filtering material, comprising a filter chamber, a filter bed in said chamber, means to cause a flow of a non-aqueous cleansing agent through the filter bed in a direction reverse to the flow of the hydro-carbon, and means to supply a hot stream of water vapor through the bed, each of said means being valve controlled for successive flows.

LESLIE W. NAYLOR.